(12) United States Patent
Gasper

(10) Patent No.: US 9,174,570 B2
(45) Date of Patent: Nov. 3, 2015

(54) WIRELESS LIGHT AND ACCESSORY CONTROL SYSTEM FOR GOLF CARTS AND OTHER VEHICLES

(76) Inventor: Joseph Gasper, Gainesville, FL (US)

( * ) Notice: Subject to any disclaimer, the term of this patent is extended or adjusted under 35 U.S.C. 154(b) by 69 days.

(21) Appl. No.: 12/480,811

(22) Filed: Jun. 9, 2009

(65) Prior Publication Data

US 2010/0308989 A1   Dec. 9, 2010

(51) Int. Cl.
*B60Q 1/26* (2006.01)
*B60Q 1/14* (2006.01)

(52) U.S. Cl.
CPC .............. *B60Q 1/1415* (2013.01); *B60Q 1/26* (2013.01); *B60Q 2900/30* (2013.01)

(58) Field of Classification Search
CPC .............. B60Q 1/26; B60Q 1/46; B60Q 1/52; B60Q 2900/30
USPC ......... 340/468, 463, 465, 471, 475, 479, 429, 340/426.13, 573.1, 332, 467; 362/61, 545; 200/61.45 R, 61.52
See application file for complete search history.

(56) References Cited

U.S. PATENT DOCUMENTS

| | | | |
|---|---|---|---|
| 3,330,921 A * | 7/1967 | Cunningham | ............. 200/61.48 |
| 3,876,977 A | 4/1975 | Ladewig | |
| 4,063,789 A | 12/1977 | Kreisl | |
| 4,678,906 A | 7/1987 | Rudi et al. | |
| 4,859,982 A | 8/1989 | Seaburg | |
| 5,025,245 A * | 6/1991 | Barke | ............................ 340/471 |
| 5,719,555 A | 2/1998 | Zeytoonjian et al. | |
| 5,900,803 A * | 5/1999 | Politz et al. | ................. 340/425.5 |
| 6,229,438 B1 * | 5/2001 | Kutlucinar et al. | ........... 340/438 |
| 6,249,219 B1 * | 6/2001 | Perez et al. | ..................... 340/467 |
| 6,404,159 B1 * | 6/2002 | Cavallini | ........................ 318/587 |
| 6,548,772 B2 | 4/2003 | Liburdi | |
| 6,871,132 B2 * | 3/2005 | Olsen et al. | ...................... 701/93 |
| 7,400,238 B2 * | 7/2008 | Clark et al. | .................... 340/479 |
| 2003/0153297 A1 * | 8/2003 | Falkiner et al. | ............... 455/404 |
| 2004/0119484 A1 * | 6/2004 | Basir et al. | ..................... 324/680 |
| 2005/0115761 A1 | 6/2005 | Dinda et al. | |
| 2005/0254240 A1 * | 11/2005 | Lawrence et al. | ............. 362/231 |
| 2005/0274591 A1 | 12/2005 | Kim | |
| 2007/0132573 A1 | 6/2007 | Quach et al. | |
| 2007/0284906 A1 * | 12/2007 | Ball | ................................ 296/72 |
| 2008/0088423 A1 | 4/2008 | Liu | |
| 2008/0291003 A1 * | 11/2008 | Carpenter | ...................... 340/463 |
| 2009/0038864 A1 * | 2/2009 | Yun | ................................ 180/19.1 |
| 2009/0256698 A1 * | 10/2009 | Bonilla | ......................... 340/479 |

FOREIGN PATENT DOCUMENTS

| | | | | |
|---|---|---|---|---|
| DE | 10345701 | 4/2005 | | |
| DE | 10358946 | 6/2005 | | |
| FR | 2819223 | 7/2002 | | |
| GB | 2257672 | * 1/1993 | .................... 340/479 |
| WO | PCT/US89/02287 | 12/1989 | | |
| WO | PCT/DE97/02759 | 6/1998 | | |
| WO | PCT/DE99/03426 | 6/2000 | | |

\* cited by examiner

*Primary Examiner* — Hung T Nguyen
(74) *Attorney, Agent, or Firm* — Saliwanchik, Lloyd & Eisenschenk

(57) ABSTRACT

A wireless light and accessory control system for golf carts (18) and other vehicles having a sender (1) that permits a user to remotely activate various accessories, such as headlights (2), turn signals (4), horns (5) and other accessories, such as radios, dome lights, etc., by sending signals via a wireless transmitter (12) located in the sender to controllers (13) located in each of the accessories. In addition, brake lights (3) may be activated and deactivated by a motion sensing means (10) in addition to being deactivated after a predetermined amount of time by a timer (11).

18 Claims, 3 Drawing Sheets

WIRELESS LIGHT AND ACCESSORY CONTROL SYSTEM FOR GOLF CARTS AND OTHER VEHICLES

FIELD OF THE INVENTION

This invention relates to golf carts, more particularly, a wireless light and accessory control system that allows a user to install accessories, such as head lights, brake lights, turn signals, a horn, etc., on a new or used golf cart and operate those accessories using a sender which transmits wireless signals to the controller.

BACKGROUND OF THE INVENTION

Currently, many vehicles, particularly, golf carts, trailers, tractors, utility vehicles and all terrain vehicles, do not come equipped with headlights, brake lights, turn signals and/or horns. This lack of such safety equipment is because such vehicles are built for special purposes and uses. For instance, most golf carts are built to be used solely on golf courses where these types of safety accessories are not necessarily needed. However, many people buy golf carts to use not just as a means of transportation on golf courses but also around their neighborhoods and communities. This is especially true of people who live in golf or country club communities and own their own golf carts and drive their golf carts on streets from their homes to the golf course where others are operating automobiles and other vehicles. The lack of safety accessories, such as headlights, brake lights, turn signals and/or horns, on these golf carts pose serious safety risks and is against the law in certain areas of the country. Currently if someone wants to install accessories on a golf cart, the accessories must be hard-wired to controls mounted on the golf cart, thereby making installation difficult and expensive.

Therefore, a need exists for a safety accessory kit that may be easily installed on a vehicle so that the vehicle will be equipped with headlights, turn signals, brake lights, a horn and so forth, thereby being safer to operate on streets and around other vehicles.

The relevant prior art includes the following references:

| Pat. No. (U.S. unless stated otherwise) | Inventor | Issue/Publication Date |
| --- | --- | --- |
| 2008/0088423 | Liu | Apr. 17, 2008 |
| 2007/0132573 | Quach et al. | Jun. 14, 2007 |
| DE10345701 | Bergdolt | Apr. 21, 2005 |
| 2005/0115761 | Dinda et al. | Jun. 02, 2005 |
| DE10358946 | Elflein | Jun. 09, 2005 |
| 2005/0274591 | Kim | Dec. 15, 2005 |
| 6,548,772 | Liburdi | Apr. 15, 2003 |
| FR2819223 | Alves et al. | Jul. 12, 2002 |
| PCT/DE99/03426 | Besier et al. | Jun. 02, 2000 |
| 5,900,803 | Politz et al. | May 04, 1999 |
| 5,719,555 | Zeytoonjian et al. | Feb. 17, 1998 |
| PCT/DE97/02759 | Peter et al. | Jun. 11, 1998 |
| 4,859,982 | Seaburg | Aug. 22, 1989 |
| PCT/US89/02287 | Anderson | Dec. 14, 1989 |
| 4,678,906 | Rudi et al. | Jul. 07, 1987 |
| 4,063,789 | Kreisl | Dec. 20, 1977 |
| 3,876,977 | Ladewig | Apr. 08, 1975 |

SUMMARY OF THE INVENTION

The primary object of the present invention is to provide a wireless light and accessory control system for golf carts and other vehicles that can be easily installed on any golf cart.

Another object of the present invention is to provide a wireless light and accessory control system for golf carts and other vehicles that makes a golf cart safer to operate on streets.

An even further object of the present invention is to provide a wireless light and accessory control system for golf carts and other vehicles that may be retrofitted to other vehicles, such as trailers, tractors, utility vehicles, mowers, all terrain vehicles and so forth.

Another object of the present invention is to provide a wireless light and accessory control system for golf carts and other vehicles that will reduce wiring requirements by at least 33%.

A further object of the present invention is to provide a wireless light and accessory control system for golf carts and other vehicles that will reduce installation time by 75%.

The present invention fulfills the above and other objects by providing a wireless light and accessory control system for golf carts and other vehicles having a sender that permits a user to remotely activate various accessories, such as headlights, side marker lights, horns, turn signals, and other accessories, such as auxiliary lights, radios, dome lights, etc., by sending wireless signals via a wireless transmitter located in the sender to a controller or multiple controllers electronically connected to the accessories. The wireless signals may be coded signals. In addition, the wireless transmitter may be a multi-frequency wireless transmitter. The sender has a plurality of buttons to activate and deactivate the various accessories on the golf cart. The sender may also have indicator lights to indicate when accessories are activated. The sender may be mounted on or anywhere near a steering wheel or operator. In addition, accessories may be activated or deactivated using timers, speedometers, motion sensing means and so forth. For example, a timer would deactivate turn signals after a predetermined amount of time. In addition, brake lights would be activated and deactivated by a motion sensing means, such as a motion sensor, a tilt switch, an accelerometer, a speedometer, etc. In addition, the brake lights may be deactivated after a predetermined amount of time by a timer. In addition to being used in golf carts, the system may also be used on other vehicles, such as trailers, tractors, utility vehicles, all terrain vehicles and so forth.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
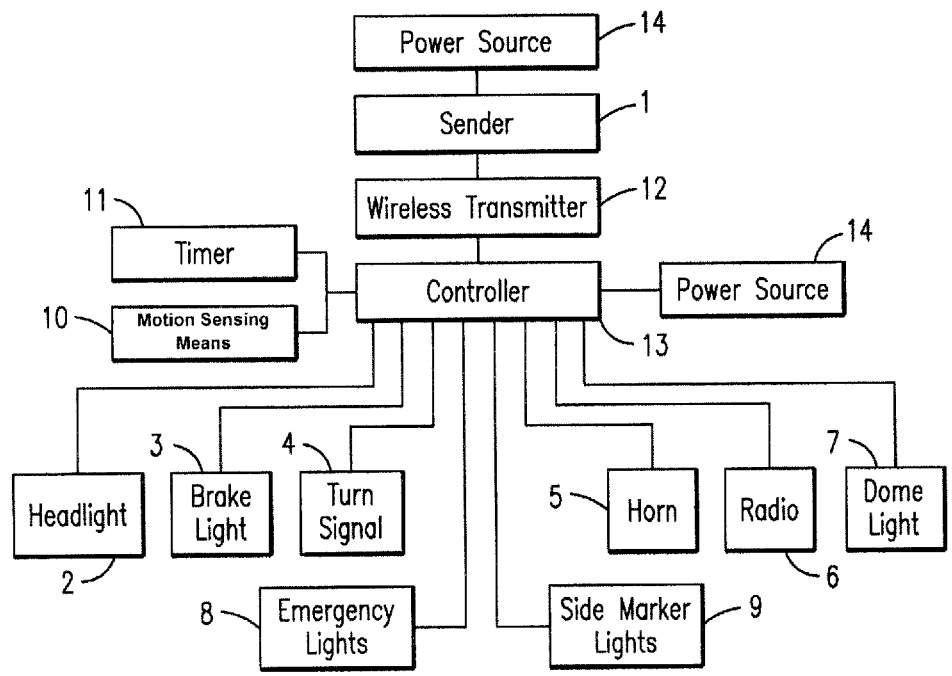
FIG. 1 is a block diagram of a wireless light and accessory control system for golf carts and other vehicles.
Figure 5:
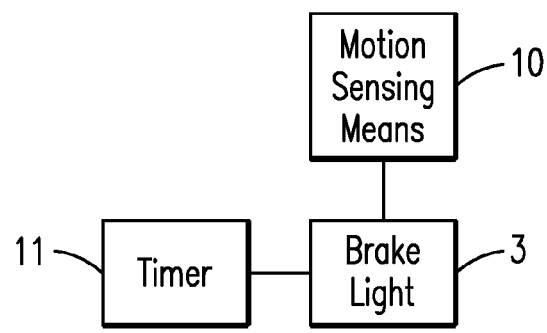
FIG. 5 is a block diagram of an alternative embodiment of a wireless light and accessory control system for golf carts and other vehicles.

For purposes of describing the preferred embodiment, the terminology used in reference to the numbered accessories in the drawings is as follows:
1. sender
2. head light
3. brake light
4. lum signal
5. ham
6. radio
7. dome light
8. emergency light
9. side marker light
10. motion sensing means
11. timer
12. wireless transmitter
13. controller
14. power source
15. steering wheel
16. push button
17. indicator light
18. golf cart With reference to FIG. 1, a block diagram of a wireless light and accessory control system for golf carts and other vehicles is shown. The wireless light and accessory control system for golf carts and other vehicles is comprised of a sender 1 that permits a user to remotely activate various accessories~such as headlights 2, brake lights 3, turn signals 4, a horn 5, a radio 6, a dome light 7, emergency lights 8, side marker lights 9 and so forth, by sending wireless signals via a wireless transmitter 12 located in the sender 1 to a controller 13 that is electronically connected to each of the accessories. The wireless transmitter 12 may be a single or multi-frequency wireless transmitter. Further, the wireless signals may be coded for each accessory being activated or deactivated. In addition, the accessories may be activated or deactivated using timers 11, or a motion sensing means 10. For example, after a predetermined amount of time, a timer 11 located in the controller 13 would deactivate the turn signals 4. A signal from a motion sensing means 10, such as a motion sensor, a tilt switch, an accelerometer, a speedometer, etc., that sends a signal to the controller 13 or directly to the brake lights 3, as shown in FIG. 5, would activate and deactivate the brake lights 3. In addition, a timer 11 located in the controller 13 may deactivate the brake lights 3 after a predetermined amount of time. The controller 13 and accessories would be powered by a power source 14, such as an internal battery or a golf cart battery. The sender 1 would also be powered by a power source 14, such as an internal battery or a golf cart battery.

Figure 2:
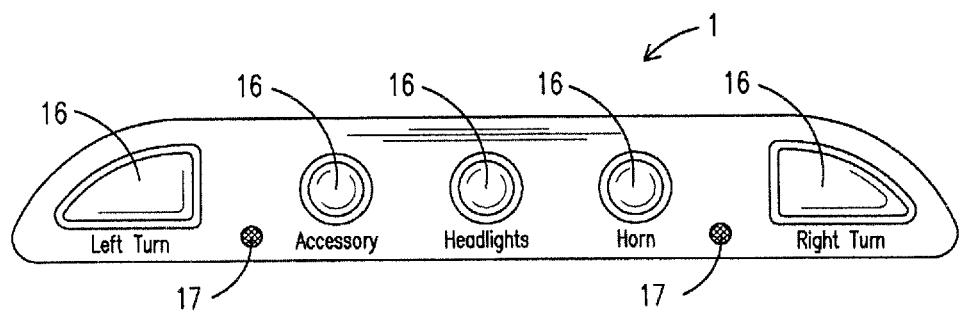
FIG. 2 is a front view of a sender of a wireless light and accessory control system for golf carts and other vehicles.
Figure 3:
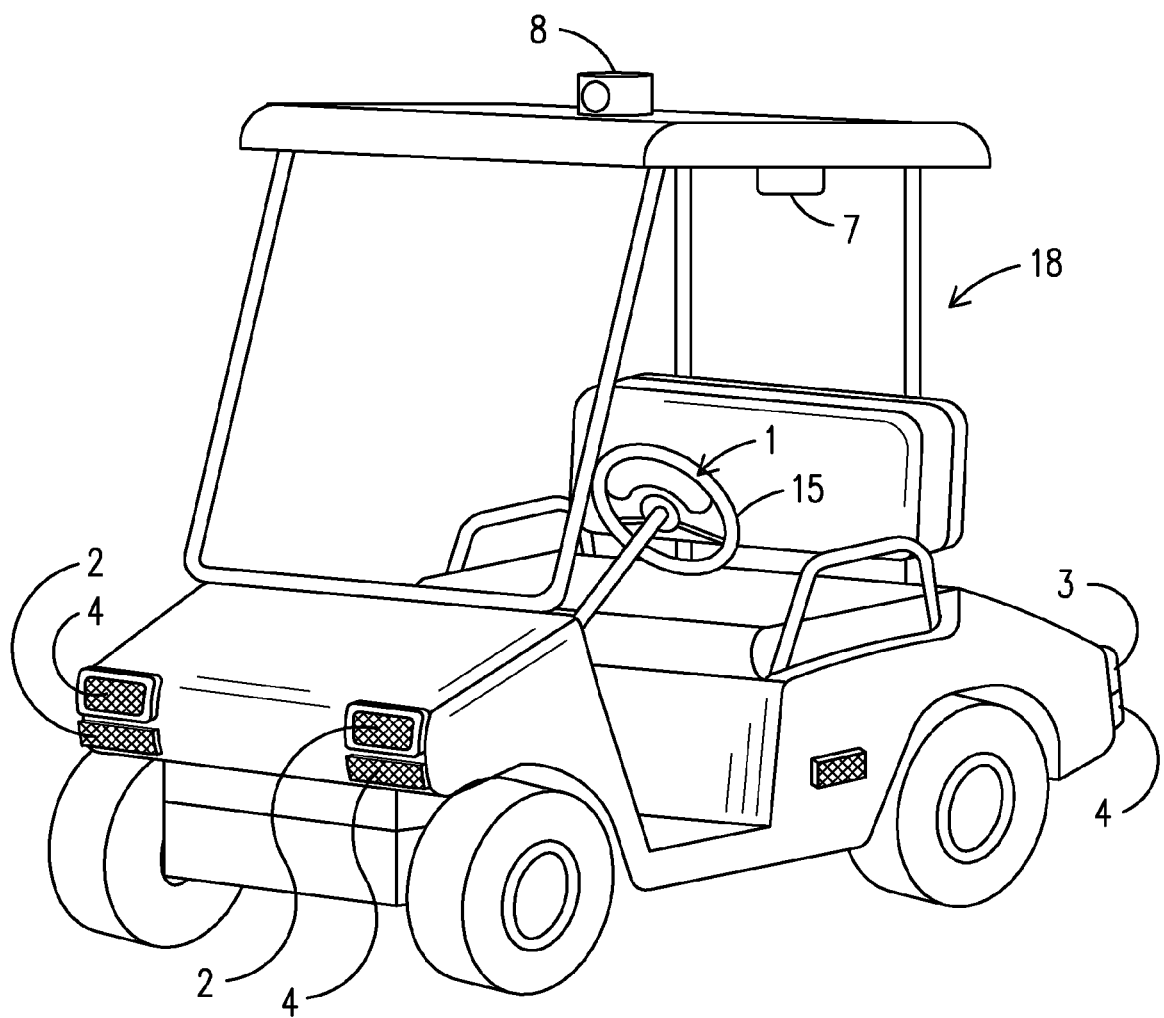
FIG. 3 is a front perspective view of a golf cart having a sender and accessories of the wireless light and accessory control system for golf carts and other vehicles mounted thereon.
Figure 4:
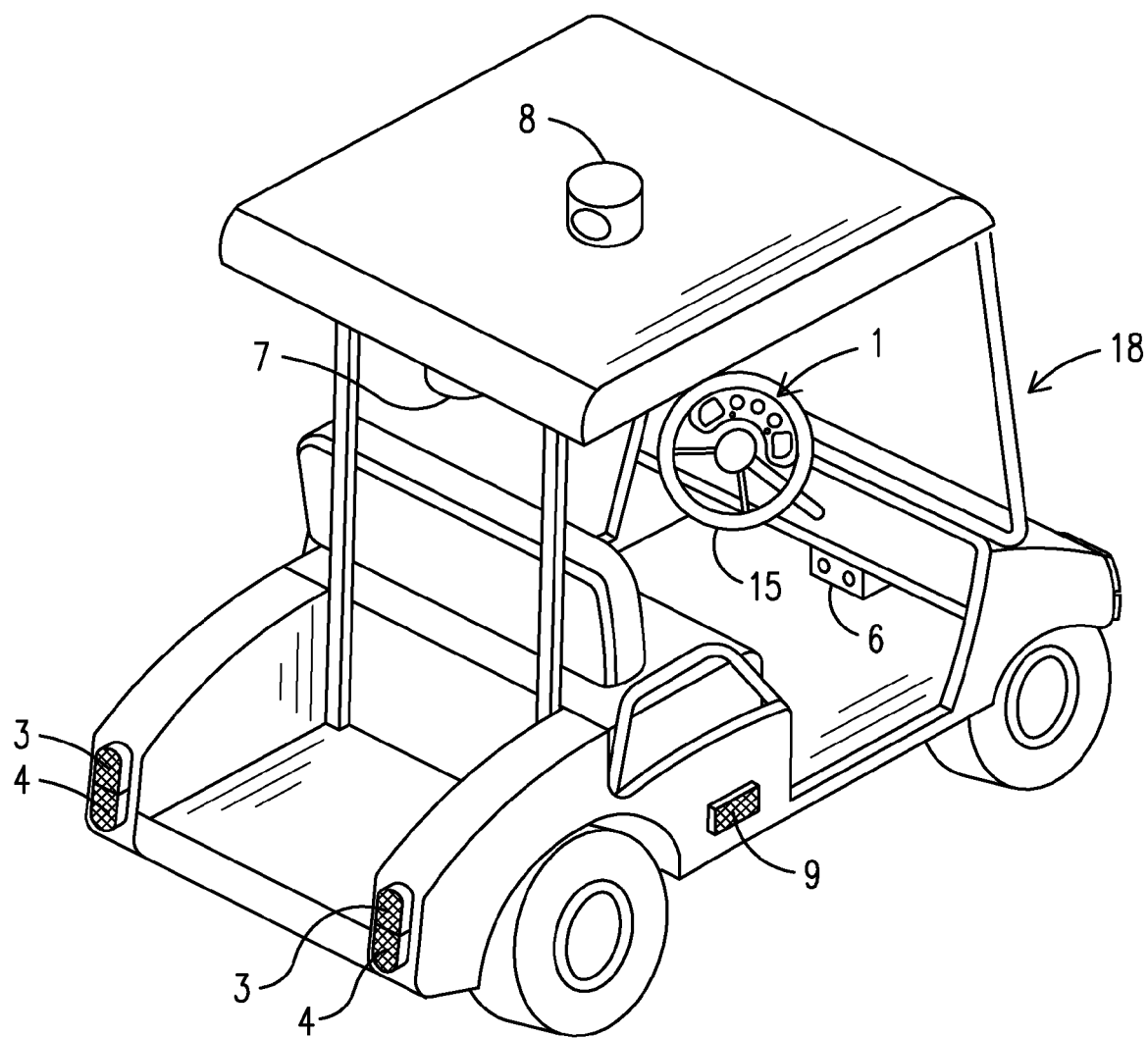
FIG. 4 is a rear perspective view of a golf cart having a sender and accessories of the wireless light and accessory control system for golf carts and other vehicles mounted thereon.

Now referring to FIG. 2, a front view of a sender 1 of a wireless light and accessory control system for golf carts and other vehicles is shown. The sender 1 may be mounted to a steering wheel 15, as shown in FIGS. 3 and 4, or in the vicinity of the steering wheel, such as to the dash board, console, roof, steering column, etc. using various attachment means, such as brackets, screws, clamps, glue, hook and loop fasteners and so forth. The sender 1 permits a user to remotely activate the various accessories of the wireless light and accessory control system for golf carts and other vehicles by wireless signals via a wireless transmitter 12 located in the sender 1 to a controller 13 that is electronically connected to each of the accessories. The wireless transmitter 12 may be a single or multi-frequency wireless transmitter. Further, the wireless signals may be coded for each accessory being activated or deactivated. The sender 1 includes a display having a plurality of push buttons 16 to activate and deactivate the various accessories connected to the controller 13. The sender 1 may also have indicator lights 17 that illuminate to indicate when accessories are activated, for example indicator lights 17 may be programmed to blink when the turn signals 4 are activated.

Now referring to FIG. 3, a front perspective view of a golf cart 18 having a sender 1 and accessories of the wireless light and accessory control system for golf carts and other vehicles mounted thereon is shown. Head lights 2 are mounted on the front of a golf cart 18 so that a user may operate the golf cart 18 safely in the dark. In addition turn signals 4 are mounted on the front and back of the golf cart 18 so that a user may communicate to third parties which direction the user is planning on turning. Brake lights 3 are mounted to the back of the golf cart 18 to warn third parties that the golf cart 18 is coming to a stop. The sender 1 is mounted to a steering wheel 15 and activates the accessories via wireless signals sent to the controller 13, as shown in FIG. 1.

Now referring to FIG. 4, a rear perspective view of a golf cart 18 having a sender 1 and accessories of the wireless light and accessory control system for golf carts and other vehicles mounted thereon is shown. Turn signals 4 are mounted on the back of a golf cart 18 so that a user may communicate to third parties which direction the user is planning on turning. Brake lights 3 are mounted to the back of the golf cart 18 to warn third parties that the golf cart 18 is coming to a stop. In addition, a radio 6, dome light 7, emergency light 8 and side marker light 9 are mounted to the golf cart 18. The sender 1 is mounted to a steering wheel 15 and activates the accessories via wireless signals sent to the controller 13, as shown in FIG. 1.

Finally, referring to FIG. 5, a block diagram of a wireless light and accessory control system for golf carts and other vehicles is shown. A signal from a motion sensing means 10, such as a motion sensor, a tilt switch, an accelerometer, a speedometer, etc., sends a signal directly to the brake lights 3 that activates or deactivates the brake lights 3. In addition, a timer 11 deactivates the brake lights 3 after a predetermined amount of time.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:
1. A control system for a golf cart, comprising:
at least one brake light, wherein the at least one brake light is mounted on a rear of a golf cart;
at least one power source,
wherein the at least one power source is positioned on the golf cart and is configured to provide power to the at least one brake light;
a controller, wherein the controller is positioned on or in the golf cart, wherein the controller is configured to control whether the at least one brake light is on or off,
a tilt switch, wherein the tilt switch is configured to send a detection signal to the controller upon sensing a change in motion of the golf cart, wherein the change in motion is a deceleration of the golf cart in a forward direction of the golf cart, wherein the tilt switch is mounted on the golf cart such that a deceleration of the golf cart in the forward direction of the golf cart of at least a threshold deceleration results in the tilt switch sending the detection signal to the controller, wherein upon receiving the detection signal from the tilt switch the controller turns on the at least one brake light; and at least one timer, wherein the at least one timer is configured to send a time signal to the controller upon the expiration of a predetermined period of time after the controller turns on the at least one brake light, wherein the controller is configured to turn the at least one brake light off upon receipt of the time signal from the at least one timer;

wherein after the controller turns on the at least one brake light, the at least one timer sends the time signal to the controller upon the expiration of the predetermined period of time after the controller turns on the at least one brake light, wherein the controller turns the at least one brake light off upon receipt of the time signal from the at least one timer, wherein the deceleration of the golf cart in the forward direction of the golf cart of at least a threshold deceleration results in the at least one brake light being turned on, and the at least one brake light being turned off upon the expiration of the predetermined period of time after the at least one brake light being turned on.

2. The control system for a golf cart of claim 1, further comprising:

a sender mounted on the golf cart, wherein the sender has at least one wireless transmitter for sending wireless signals, wherein the controller is configured to receive the wireless signals from the at least one wireless transmitter; and at least one accessory mounted on the golf cart and connected to the controller such that the controller controls the at least one accessory in response to the wireless signals.

3. The control system according to claim 1, wherein the at least one timer is located in the controller.

4. The control system according to claim 1, wherein the at least one brake light being turned on for the predetermined period of time warns third parties behind the golf cart that the golf cart is braking.

5. The control system according to claim 1, further comprising:

the golf cart.

6. The control system according to claim 5, wherein the at least one brake light being turned on for the predetermined period of time warns third parties behind the golf cart that the golf cart is braking.

7. A method of controlling a brake light on a vehicle, comprising:

positioning a controller with respect to a vehicle, wherein the vehicle comprises a brake light mounted on the rear of the vehicle and a power source positioned on the vehicle and configured to provide power to the brake light, wherein the controller is configured to control whether the brake light is on or off;

positioning a tilt switch with respect to the vehicle such that when the tilt switch senses a change in motion of the vehicle the tilt switch closes and sends a change in motion sensed signal to the controller, wherein the change in motion is a deceleration of the vehicle in a forward direction of the vehicle of at least a threshold deceleration, wherein when the controller receives the change in motion sensed signal, the controller turns the brake light on, wherein after a predetermined period of time after the controller turns the brake light on the controller turns the brake light off; and decelerating the vehicle in a forward direction of the vehicle of at least the threshold deceleration, such that (i) the tilt switch closes and sends the change in motion sensed signal to the controller, (ii) the controller turns the brake light on when the controller receives the change in motion sensed signal, and (iii) the controller turns the brake light off after the predetermined period of time after the controller turned the brake light on, wherein the deceleration of the vehicle in the forward direction of the vehicle of at least the threshold deceleration results in the brake light being turned on, and the brake light being turned off after the predetermined period of time after the brake light was turned on.

8. The method according to claim 7, wherein the vehicle is a golf cart.

9. The method according to claim 8, wherein the brake light being turned on for the predetermined period of time warns third parties behind the golf cart that the golf cart is braking.

10. The method according to claim 8, further comprising: the golf cart.

11. The method according to claim 10, wherein the brake light being turned on for the predetermined period of time warns third parties behind the golf cart that the golf cart is braking.

12. The method according to claim 7, further comprising:

positioning a timer with respect to the vehicle such that after the predetermined period of time after the controller turns the brake light on the timer sends a time expiration signal to the controller, wherein upon receipt of the time expiration signal the controller turns the brake light off.

13. The method according to claim 7, wherein the controller comprises a timer.

14. The method according to claim 7, wherein the brake light being turned on for the predetermined period of time warns third parties behind the vehicle that the vehicle is braking.

15. A control system for a vehicle brake light, comprising:

a brake light, wherein the brake light is mounted on a rear of a vehicle;

a power source, wherein the power source is positioned on the vehicle and is configured to provide power to the brake light;

a tilt switch, wherein when the tilt switch senses a change in motion of the vehicle the tilt switch closes, wherein the change in motion is a deceleration of the vehicle in a forward direction of the vehicle, wherein the tilt switch is mounted on the vehicle such that a deceleration of the vehicle in the forward direction of the vehicle of at least a threshold deceleration results in the tilt switch closing; and a controller, wherein the controller is interconnected with the power supply, the brake light, and the tilt switch such that when the tilt switch closes the controller turns on the brake light, wherein after a predetermined period of time after the controller turns on the brake light the controller turns off the brake light, wherein the deceleration of the vehicle in the forward direction of the vehicle of at least a threshold deceleration results in the brake light being turned on, and the brake light being turned off after the predetermined period of time after the brake light was turned on.

16. control system according to claim 15,
wherein the brake light being turned on for the predetermined period of time warns third parties behind the vehicle that the vehicle is braking.

17. The control system according to claim 15, further comprising:
the vehicle.

18. The control system according to claim 17,
wherein the brake light being turned on for the predetermined period of time warns third parties behind the vehicle that the vehicle is braking.

* * * * *

UNITED STATES PATENT AND TRADEMARK OFFICE
CERTIFICATE OF CORRECTION

| | | |
|---|---|---|
| PATENT NO. | : 9,174,570 B2 | Page 1 of 1 |
| APPLICATION NO. | : 12/480811 | |
| DATED | : November 3, 2015 | |
| INVENTOR(S) | : Joseph J. Gasper | |

It is certified that error appears in the above-identified patent and that said Letters Patent is hereby corrected as shown below:

IN THE SPECIFICATION

Column 3,
Line 14, "lum signal" should read --turn signal--.
Line 15, "ham" should read --horn--.

IN THE CLAIMS

Column 7,
Line 1, "control system" should read --The control system--.

Signed and Sealed this
Twenty-second Day of March, 2016

Michelle K. Lee
*Director of the United States Patent and Trademark Office*